United States Patent [19]

Ritchey

[11] 4,281,657
[45] Aug. 4, 1981

[54] TOOL FOR ATTACHING IDENTIFICATION DEVICE

[76] Inventor: Eugene B. Ritchey, Rte. 2, Box 58, Brighton, Colo. 80601

[21] Appl. No.: 109,871

[22] Filed: Jan. 7, 1980

[51] Int. Cl.³ .............................................. A61B 17/00
[52] U.S. Cl. .................................................... 128/330
[58] Field of Search ............. 128/330, 329 R; 40/300, 40/301; 227/67, 144

[56] References Cited

U.S. PATENT DOCUMENTS

| 4,000,744 | 1/1977 | Ritchey | 128/330 |
| 4,120,303 | 10/1978 | Villa-Massone et al. | 128/330 |
| 4,147,168 | 4/1979 | Hayes et al. | 128/330 |

*Primary Examiner*—Robert W. Michell
*Assistant Examiner*—Michael H. Thaler
*Attorney, Agent, or Firm*—Sheridan, Ross, Fields & McIntosh

[57] ABSTRACT

A tool is provided for installing a tag in an element to be tagged, such as an animal's ear, wherein the tool releasably holds a tag on one side of the ear and a blade on the other side of the ear is moved so as to pierce the ear to form an incision therein and to grasp the locking head of the tag on the other side of the ear and pull it back through the incision during the return movement of the cutting element and subsequently release the locking head of the tag after it has been pulled back through the incision. Since only the cutting blade or the locking head of the tag are in the incision at one time, tearing of the incision is minimized.

15 Claims, 20 Drawing Figures

TOOL FOR ATTACHING IDENTIFICATION DEVICE

DESCRIPTION

TECHNICAL FIELD

This invention relates to an apparatus and method for installing an identification tag to an element to be identified, and more particularly, to a tool for installing a tag in an ear of an animal for identification.

BACKGROUND ART

Numerous devices have been designed for installing tags made of resilient elastomeric material of the type having a laterally extensive base for receiving indicia, an anchoring head in the general plan form of an arrowhead with a narrow leading end or tip and rearwardly diverging locking flanges joined to the base by a narrow neck. Each of these installing tools has been characterized by the fact that it includes a sharp cutting edge for cutting a slit in the ear and normally pulls or pushes the anchoring head through the slot along with the cutting blade until the anchoring head is on the opposite side of the ear and locked in place. Various installing tools have been devised for cutting a slit in the ear, rolling over the wings of the anchoring head so that they may be pushed through the slit and reopened on the other side to lock the tag in the ear. One of the first such devices is disclosed in my U.S. Pat. No. 3,552,051 wherein the anchoring head is rolled up and inserted in the end of a tubular handle on an intalling tool. Another such device is shown in my U.S. Pat. No. 3,850,360 wherein the anchoring head overlies the blade and a retaining member overlies the anchoring head. Another tool is shown in my U.S. Pat. No. 4,000,744 wherein the anchoring head is received in slots in the blade of the tool for installation. Still another tool is disclosed in my copending U.S. patent application Ser. No. 909,044, filed May 24, 1978, in which the locking flanges of the ear tag are placed in parallel vertical slots in the blade and the anchoring head is carried through the slit in the ear by the blade as it passes through the ear.

Certain disadvantages characterize each of these devices. One major deficiency with the installing tools of the prior art is that in some cases the entire tool must pass through the slit in the ear which increases the chance of tearing of the flesh adjacent the slit. In other devices, the blade, as well as the anchoring head and perhaps a retaining member, must all pass through the slit at the same time which again increases the possibility of tearing. With those installing tools where a push-pull motion is used to slit the ear and install the tag, it is again necessary to have both the blade and the anchoring head in the slit at the same time. Since the slit is made by the blade alone, it does not have in all cases sufficient height to accommodate both the blade and the thickness of the anchoring head without tearing the flesh at the ends of the slit.

DISCLOSURE OF INVENTION

In accordance with this invention, an apparatus and method is provided for installing an ear tag in the ear of the animal wherein the installing device makes an incision or slit in the ear and then pulls the anchoring head of the tag through the slit wherein the cutting blade or the anchoring head is in the slit at the same time, but not both. In this regard, a hand tool for attaching the tag is provided wherein the tool includes means for releasably holding the anchoring head of the tag on one side of an element, such as an ear, to be tagged. An element piercing means is positionable on the opposite side of the element to be tagged and means for moving the element piercing means through the element to be tagged is also provided. In addition, there is means forming part of the element piercing means for grippingly engaging the tip of the anchoring head after the element piercing means is moved through the element to be tagged and means moving the element piercing means back to the opposite side of the element to be tagged to pull the anchoring head through the element so that it is tagged. Finally, there is means to release the tip engaging means after movement of the element piercing means back to the other side of the tagged element.

More particularly, the hand tool includes a support bracket, a first arm having one end pivotally connected to the support bracket, a second arm having one end connected to the support bracket, a pointed blade having a base connected to the other end of the second arm and having its point extending toward the holding means, the second end of the first and second arm being moveable toward each other when an animal's ear is therebetween so that the blade pierces the ear and extends through the slit formed in the ear so that the point thereof comes into contiguous relationship with the tip of the anchoring head. In addition, there is a gripping finger extending generally parallel to and spaced from the surface of the blade adjacent the tip thereof and mounted for pivotal movement about the base of the blade. Furthermore, there is a clamping rod having one end connected to the base end of the gripping finger and extending generally at right angles to the gripping finger. There is also a third arm pivoted intermediate its ends to the support bracket which extends between the first and second arms. A yoke is connected to one end of the third arm and is extendable around a substantial portion of the blade to support the ear adjacent the slit formed in the ear as the blade moves back and forth through the slit. Finally, there is a fourth arm pivoted intermediate its ends about a pivot point on the support bracket and having a first end pivotally connected to the second end of the clamping rod. The second end of the fourth arms a second handle for pivoting the second end of the rod past the center of the pivot point to move the finger toward the blade to grip the tip of an anchoring head and to bring the first end of the fourth arm into engagement with the second arm intermediate its ends whereupon upon continued movement of the fourth arm pivots the second arm so that the blade and gripping finger move away from the tag holding means and through the yoke to pull the anchoring head through the slit in the ear. A resilient means interconnects the first end of the fourth arm with the second arm intermediate its pivot and the yoke to normally urge the yoke away from the tag holding means to urge the gripping finger away from the blade. The outer end of the first arm includes a generally U-shaped channel attached at substantially right angles thereto and extending away from the second arm. The anchoring head is releasably held by a capture clip pivoted to the distal end of the channel and having spaced pairs of fingers for releasably holding and locking the head on opposite sides of the neck and a lever for pivoting the clip between a raised anchoring head receiving position and a lowered position wherein the pairs of fingers cooperate with the sides of the channels to bend the locking flanges at right angles to the remainder of the anchoring head. A pair of yieldable spring fingers are attached adjacent to the other end of the first arm and extend over the open end of the channel from opposite sides between the capture clip and the yoke for rolling the locking flanges over on top of each other so that they are generally parallel to the remainder of the anchoring head for passage through the slit in the ear.

Advantageously, if desired, a tag having an elongated neck may be provided wherein the tag is looped around an element such as a pipe to be tagged wherein the anchoring head is inserted through a slit formed in the base of the tag. In order to install the tag, the head of the tag is inserted in the capture clip as before and the tag is folded over the pipe or other element to be tagged in position between the yoke and the stripping plate whereupon the blade passes through and forms a slit in the base of the tag and grips the anchoring head and pulls it back through the slit to lock the anchoring head in the base with the neck encircling the tagged element.

From the foregoing, the advantages of the present invention are readily apparent. A unique apparatus and method is provided for installing an ear tag in an animal wherein the blade of the installing device passes through the ear to form a slit and grips the tip of the anchoring head, pulling the tip through the slit which has been formed so that the blade and the anchoring head pass successively through the slit rather than at the same time to minimize the chance of tearing the flesh around the slit. Also, the device can be used to attach a tag in an encircling relationship around a pipe or other tubular element, such as a cable, wherein a slit is formed in the base of the tag and the anchoring head is pulled through the slit in the base so that the neck completely encircles the pipe or cable or the like.

Additional advantages of this invention will be apparent when taken in conjunction with the accompanying drawings.

BEST MODE FOR CARRYING OUT THE INVENTION

Figures 1, 2, 3, 4:
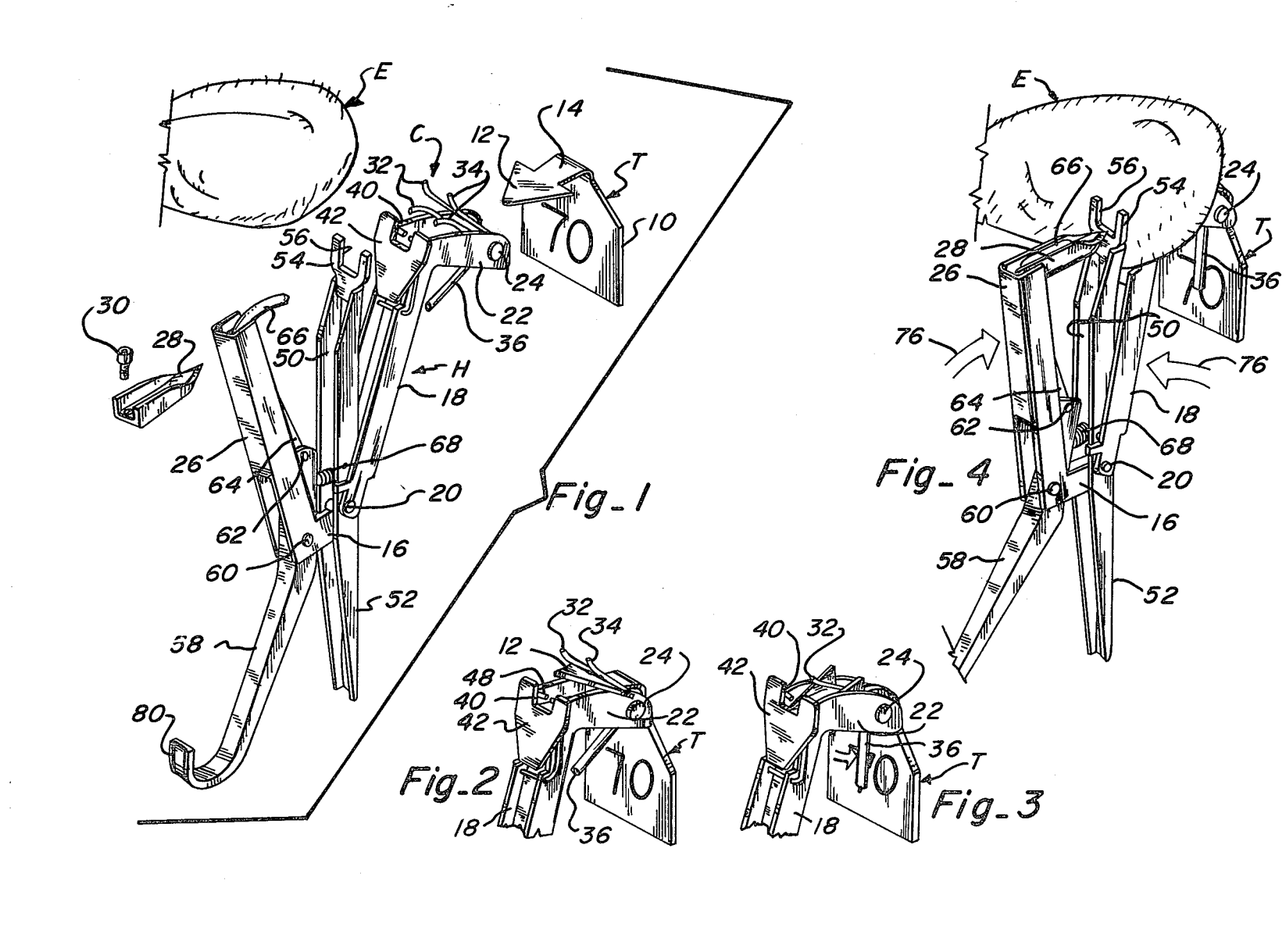
FIG. 1 is a perspective view showing the hand tool of this invention with the cutting blade removed and showing an ear tag prior to placement in the tool.
FIG. 2 is a fragmentary perspective view showing a tag held in the capture clip in raised position.
FIG. 3 is a fragmentary perspective view, similar to FIG. 2, showing the tag in the tool with the capture clip in installing position.
FIG. 4 is a perspective view of the tool of this invention showing it positioned with a tag in place adjacent an ear for installing therein.

In accordance with one form of the invention, a hand tool H is provided as shown in FIG. 1 for installing an ear tag T in the ear E of an animal such as a cow or sheep. The tag T is generally of the type which is made of a resilient elastomeric material and includes a laterally extensive base 10 for receiving an indicia. The tag also includes an anchoring head 12 which is conveniently in the general plan form of an arrowhead with a narrow leading end or tip and rearwardly diverging locking flanges joined to the base by a narrow neck 14.

Figures 9, 12:
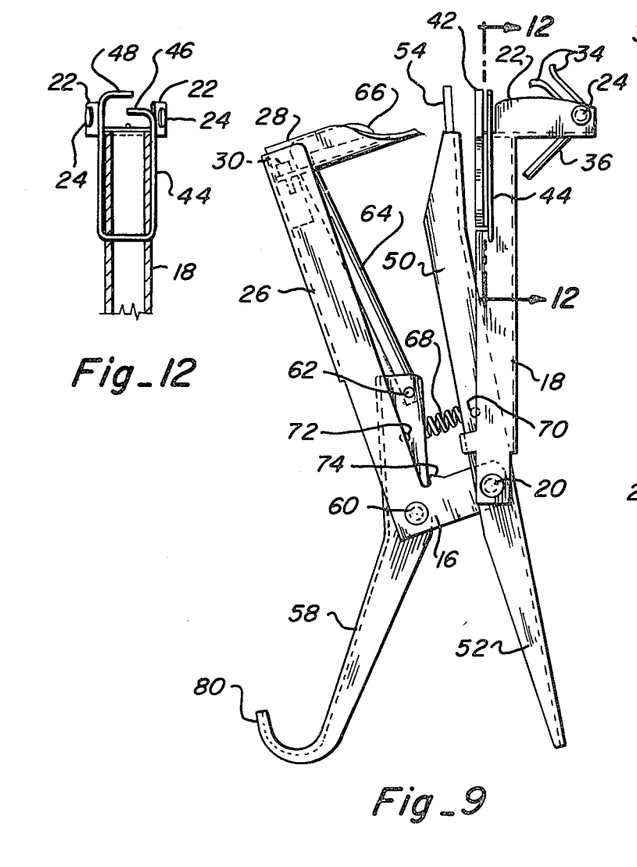
FIG. 9 is a side elevation of the tool of the invention.
FIG. 12 is a fragmentary vertical section, taken along line 12—12 of FIG. 9 showing the resilient fingers for rolling the locking flanges of the anchoring head on top of each other during insertion.

The hand tool H includes a support bracket 16 to which virtually all other parts are directly or indirectly connected. A first arm 18 has one end pivotally connected to bracket 16 by means of a pivot pin 20. Conveniently, the upper end of arm 18 is provided with a generally U-shaped channel 22 for supporting a capture clip C for pivotal movement about a post 24 for receiving and positioning the anchoring head 12 as described more fully below. A second arm 26 is formed integrally with support bracket 16 and supports cutting blade 28 which is generally U-shaped as shown in FIGS. 1 and 9 and is removeably attached to the upper end of arm 26 as by means of screw 30. Thus, the blade can be removed for sharpening or replacement. As will be explained more fully below, the ear E of the animal to be tagged can be placed between the upper end of arm 18 and 26 and the arms pivoted toward each other so that blade 28 pierces the ear and is in a position for gripping the tip of anchor head 12 to pull the end of the anchor head through the slit formed in the ear by the blade 28.

Figure 14:
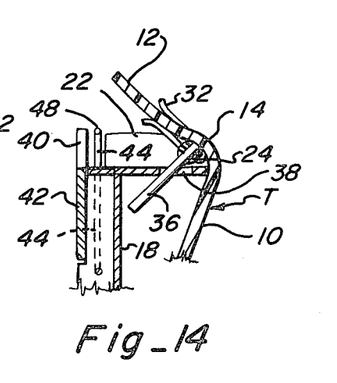
FIG. 14 is an enlarged fragmentary section of the capture clip in raised position showing a tag positioned therein.
Figure 15:
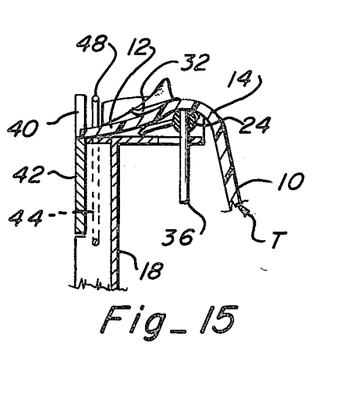
FIG. 15 is a fragmentary enlarged section, similar to FIG. 14, but showing the tag in installing position.

In order to install a tag, the capture or holding clip C is first placed in the raised position shown in FIGS. 1, 2 and 14 and the locking flanges of the anchor head 12 are slid down between spaced wire clips 32 and 34 as shown with the neck 14 of the tag therebetween. Conveniently, wire clips 32 and 34 are secured to post 24 which is pivoted between channels 22 by means of lever 36. This lever 36 extends through a slot 38 in the bottom of channel 22, as shown. After the anchoring head 12 is slipped between clips 32 and 34, lever 36 is pulled downwardly from the position shown in FIG. 2 to that shown in FIG. 3 wherein the cooperation between the clips and the sides of channel 22 cause the locking flanges of the anchoring head to be bent upwardly at approximately a ninety degree angle, as shown in FIGS. 3 and 15. When in this position, the tip of the anchoring head extends through an opening 40 in an ear support plate 42 attached at the upper end of arm 18, as shown. Conveniently, adjacent the ear support plate is a generally U-shaped locking flange folding clip 44 which is best seen in FIG. 12 and has a first end 46 bent inwardly within channel 22 and a second end 48 generally parallel to and spaced above end 46 and extending above channel 22. It can be seen that as the tag is pulled through opening 40 in ear support plate 42 and through the ear, the locking flanges which are initially generally perpendicular to the neck of the tag will be folded over on top of each other so as to pass through the slit in the ear without tearing the flesh around the slit.

Figure 5:
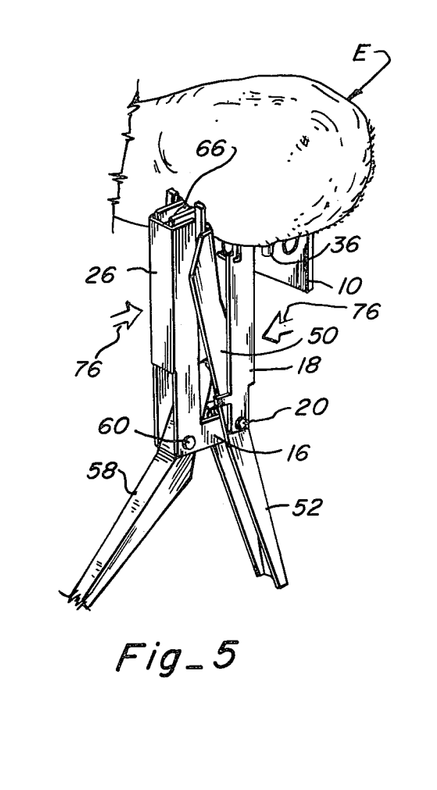
FIG. 5 is a perspective view, similar to FIG. 4, but showing the cutting blade piercing the ear to form a slit.
Figure 6:
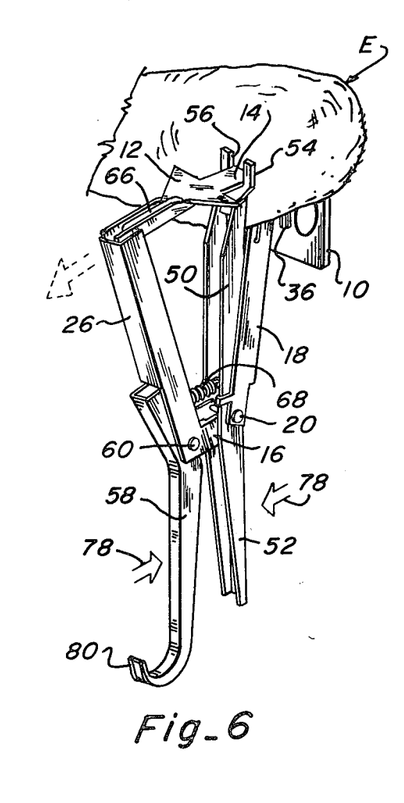
FIG. 6 is a perspective view, similar to FIGS. 4 and 5, but showing the anchoring head of the ear tag being pulled through the ear by the tool.

A third arm 50 is pivoted at pivot pin 20 on support bracket 16 and extends below the bracket to form a handle 52. At the upper end of arm 50 is a strapping plate or yoke 54 having a central opening 56. The yoke serves to hold the the ear against the support plate 42 during both the slitting of the ear by blade 28 which passes through opening 56 and the pulling of the tag anchoring head 12 through the ear, as best shown in FIGS. 5 and 6, which strips the head from the capture clips.

Figure 10:
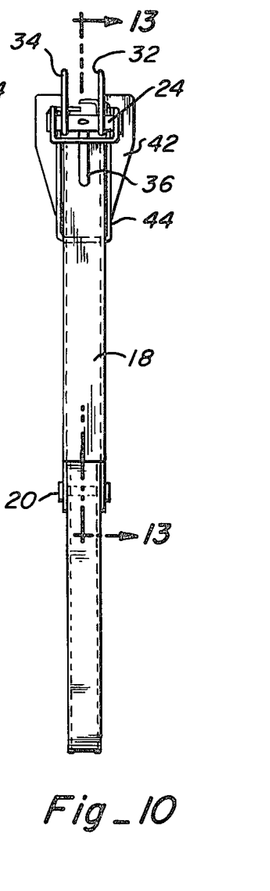
FIG. 10 is a front elevation of the tool of FIG. 9.
Figure 11:
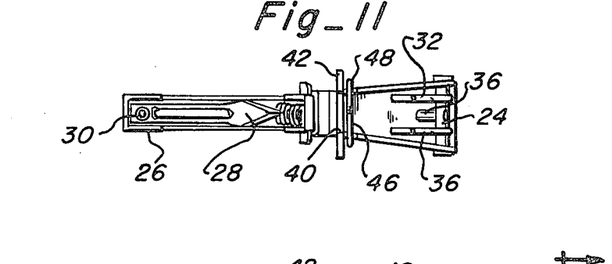
FIG. 11 is a top plan view of the tool of FIG. 9.
Figure 13:
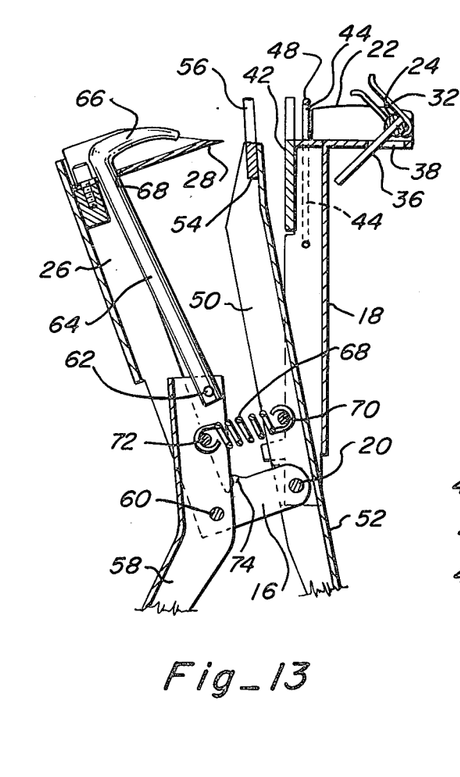
FIG. 13 is an enlarged fragmentary side elevation of the tool of FIG. 9, partly in section, showing further details of its construction.

A second handle 58 is pivoted at an intermediate point by means of pivot pin 60 to the opposite end of support bracket 16. The upper end of handle 58 is pivotally connected by means of pivot pin 62 to arm 64 which is integrally formed with gripping finger 66 which extends through an opening 68 in the bottom of blade 28 and is pivoted about opening 68 by movement of handle 58 to be described. Conveniently, the upper end of arm 58 is normally pulled toward third arm 50 by a resilient means such as coil spring 68 connected between posts 70 and 72 on arms 50 and 58, respectively. This holds the upper end of arm 58 against stop 74 on support bracket 16. As can best be seen in FIG. 10, stop 74 can be in the form of flanges which are bent inwardly from support bracket 16.

Figure 7:
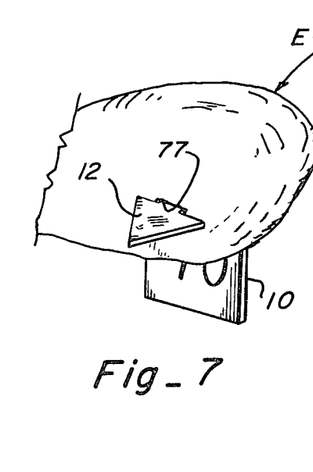
FIG. 7 is perspective view showing the tag installed in the ear of an animal.
Figure 8:
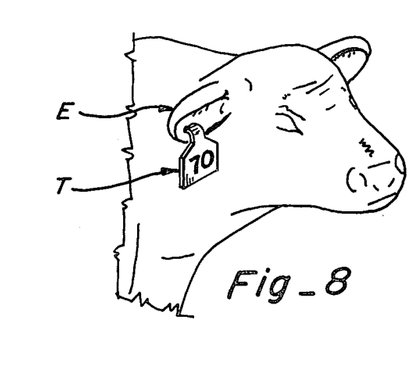
FIG. 8 is another view of an animal having an ear tag installed in its ear.
Figure 16:
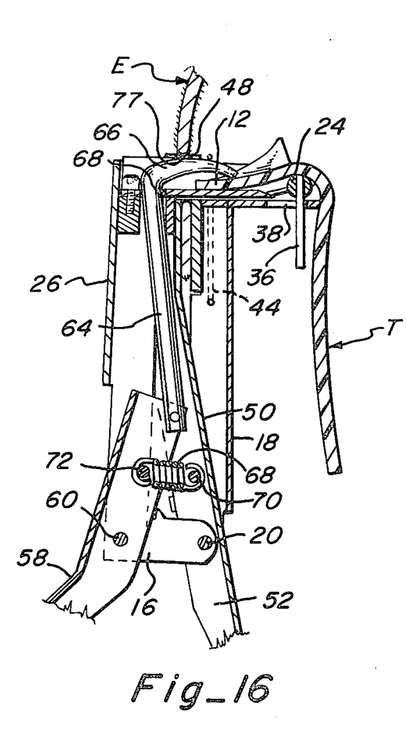
FIG. 16 is a fragmentary side elevation, similar to FIG. 13, but showing the blade piercing the ear and the finger gripping the tip of the anchoring head between it and the blade for pulling the anchoring head through the slit.
Figures 17, 18, 19, 20:
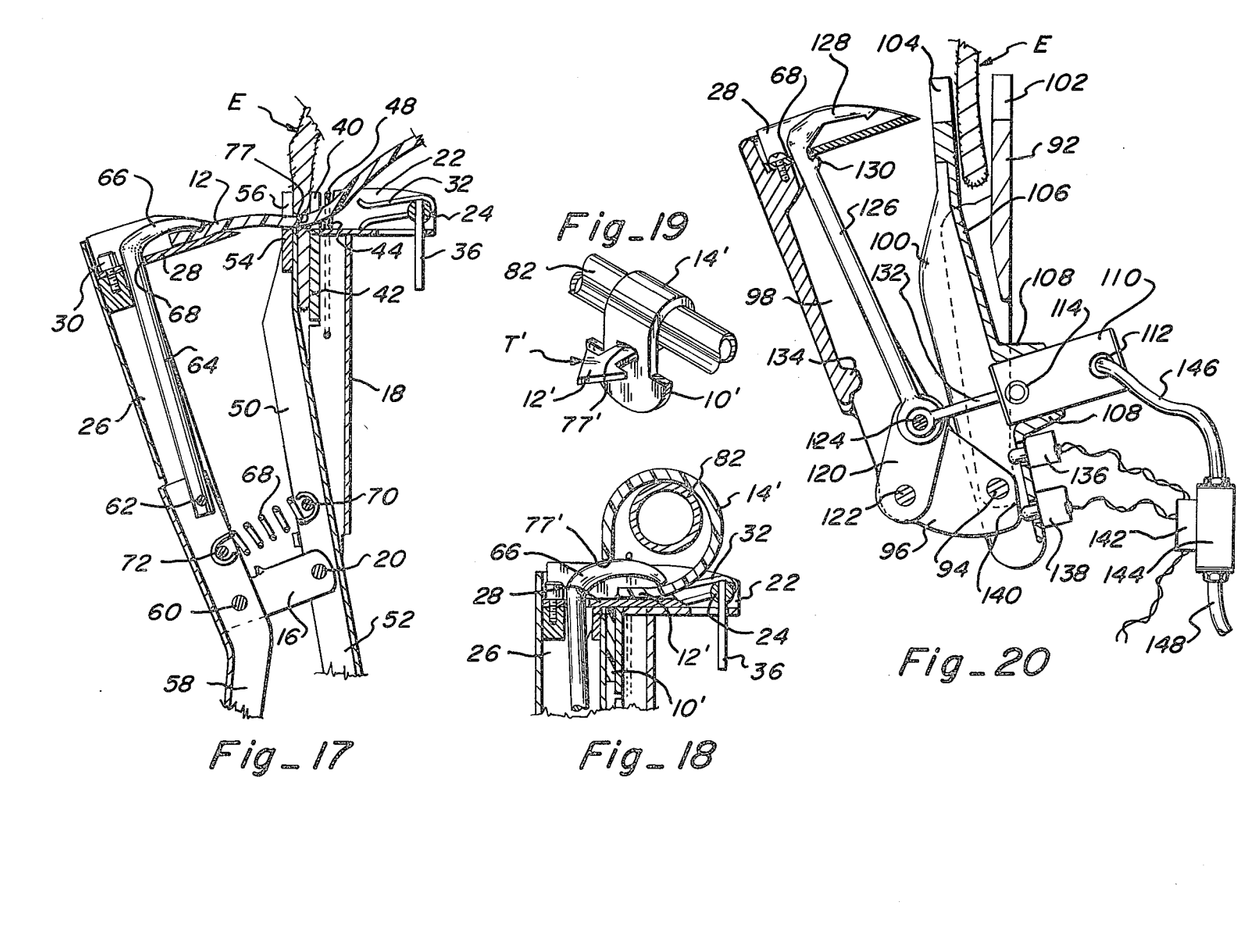
FIG. 17 is a fragmentary side elevation, similar to FIGS. 13 and 14, but showing the anchoring head after it is pulled through the slit.
FIG. 18 is a fragmentary section showing the tool being used to install a tag around a pipe.
FIG. 19 is a perspective view showing a tag installed around a pipe.
FIG. 20 is a fragmentary side elevation showing an alternative embodiment of the tool of this invention.

After the tag has been inserted in the capture clip C as previously described, the tool is held with arms 18 and 50 separated and arm 50 virtually against the side of arm 26 so that the ear can be received and positioned between ear support plate 42 and blade 28. Once the ear is in position, arms 18 and 26 are quickly swung toward each other in the direction of the arrows 76 shown in FIG. 4. As a result of this movement, blade 28 pierces the ear forming a slit therein and engages the underside of the tip of anchoring head 12 as best seen in FIG. 16. Conveniently, gripping finger 16, which is spaced from blade 28, slides over the top of the tip of the anchoring head during this movement. Next, handles 52 and 58 are squeezed toward each other in the direction of arrow 78, shown in FIG. 6. This movement causes arm 58 to begin pivoting about pivot pin 60 which will move arm 64 to the left, as viewed in FIG. 16 so as to pivot finger 66 about opening 68 into clamping engagement with the tip of anchoring head 12. Continued movement or squeezing of handles 52 and 58 toward each other will now cause arm 26 to move away from 50 pulling the anchoring head 12 of ear tag T through slit 77 as best seen in FIG. 17. Conveniently, yoke 54 holds ear E in place as the tag is being pulled through 77. The tag will be pulled through the ear until base 10 contacts the other side of the slit with neck 14 of the tag bridging the slit. The operator of the hand tool will then loosen his grip on handles 52 and 58 which will cause spring 68 to pivot the upper end of arm 58 toward arm 50 thereby releasing gripping finger 66 from the tip of anchoring head 12. The operator then gives a downward jerk on the tool which is facilitated by the edge of his hand engaging the turned-up lower end 80 of handle 58. In other words, the edge of the hand will engage end 80 and by pulling downward and away from the tag, the tag will be separated from the tool. Just prior to this separation, the folding clip 44 extends around the neck of the tag and this will be spread apart at the top so that the neck will slide past clip ends 46 and 48 leaving the tag placed in the ear as shown in FIGS. 7 and 8.

The hand tool just described can also be used for attaching a tag, as shown in FIGS. 18 and 19, wherein the tag T' has an anchoring head 12' attached to an elongated neck portion 14' which in turn is connected to laterally extensive base 10' which can be used to go around a cylindrical element, such as a cable or pipe 82. The tag is placed in the capture clip in a similar manner as previously described except that the curve of the neck is positioned to swing back over the ear supporting plate 42 as shown in FIG. 18. The pipe 82 is placed over the locking head 12' as shown so that it is encircled by the elongated neck 14'. Then, upon operation of the tool, rather than the blade piercing the ear of an animal, it pierces the base of the tag forming a slit 77' therein whereupon the locking head 12' can be pulled through the slit to the position shown in FIG. 19 so that the tag is secured on pipe 82 by having elongated neck 14' of the tag encircling the pipe as shown. This method of tagging can be used for telephone cables, electrical conduits and the like.

An alternative embodiment of the hand tool is shown in FIG. 20 wherein the gripping finger and the pulling of the tag are actuated by fluid pressure. For clarity, some of the elements of this embodiment have been ommitted from FIG. 20, such as the U-shaped channel 22 and the pivotally mounted capture clip C provided thereon. It is to be understood that these elements still are included and positioned as previously shown to retain the anchoring head of the tag in proper position prior to actuation.

In this embodiment, a first arm 92 is pivotally attached by pivot pin 94 to a common support bracket 96. The support bracket 96 in this embodiment actually forms and is integral with the lower portion of a second arm 98 with the other end of this arm arranged to receive and support a cutting blade 28 which was previously described. A third arm 100 is also pivotally mounted on pivot pin 94 and placed intermediate the first arm 92 and second arm 98. The upper end of first arm 92 has an opening 102 provided therein for the passage of the blade 28. The U-shaped channel and capture clip mentioned above are provided so as to extend outwardly from the right side of the opening or yoke 102 and the upper end of first arm 92. The intermediate or third arm 100 also has an opening or yoke 104 provided in its upper end and is also arranged for passage of the blade 28. The openings 102 and 104 are aligned so that the point and body of the blade 28 passes easily therethrough without excessive clearance around the sides of the openings.

The animal's ear E or other element which is to be pierced is positioned and retained between the first arm 92 and intermediate arm 100 with these two elements pivoted toward each other and held to retain the object. The back surface 106 of the intermediate arm 100 which is opposite the second arm 98 has outwardly extending flanges 108 which are arranged to secure and rigidly support a pressure cylinder 110. Pressure cylinder 110 has an inlet port 112 and an exhaust port 114.

A link 120 is pivotally mounted at one end by pin 122 to the support bracket 96. The opposite end of link 120 is attached by means of pivot pin 124 to arm 126 which is integrally formed with gripping finger 128 which extends upwardly through opening 68 formed in the bottom of blade 28. In this embodiment, a lip 130 is provided on the inner curved surface of arm 126 and positioned to contact the underside of the blade 28 to provide a fulcrum for the pivoting of the gripping finger 128. In this way, a more positive pivoting motion can be provided for the gripping function. The end of piston rod 132 extending outwardly from the pressure cylinder 110 is also pivotally connected to pin 124. A stop 134 can be provided on the inside of the second arm 98 to restrict the pivotal movement of the arm 126. This stop will permit the movement of the pivot pin 124 past the center line between the pivot 122 and lip 130 to provide an over-center or toggle locking arrangement for the gripping finger 128. After this locking function, the force supplied by the piston rod 132 will be applied directly to the stop 134 and second arm 98 for performance of the tag pulling movement.

Switches which can be of the small plunger type can be mounted on the back side of intermediate arm 100 and equally spaced on either side of the pivot pin 94. The outer edge 140 of the support bracket 96 is arranged generally symmetrical around the pivot pin 94 and designed to form a contacting surface for the plungers of switches 136 and 138. When the second arm 98 is pivoted in a clockwise direction and held adjacent to intermediate arm 100 and first arm 92, the plunger of switch 136 will be engaged by the surface 140 of support bracket 96 causing pressurized fluid to be introduced into cylinder 110. As the second arm 98 is rotated away from intermediate arm 100, the switch 136 will be disengaged and at maximum travel, the plunger of switch 138 will be engaged signaling the end of the cycle.

The switches 136 and 138 are suitably connected to a solenoid 142 which is mounted on a pressure control valve 144. A source of fluid pressure such as air, gas, hydraulic fluid, water, etc. is connected by a hose 148 through valve 144 and hose 146 to the inlet 112 of pressure cylinder 110. The solenoid 142 is provided with a source of electrical power such as 12 volts D.C. so as to activate the valve 144. The solenoid valve in the present embodiment is electrically connected in such a way that the valve will be opened when the switch 136 is closed and held in this position until the closure of switch 138 at which time the solenoid will be deenergized and the valve closed causing the fluid pressure to be cut off. Upon closing of valve 144, the residual pressure remaining in hose 146 and pressure cylinder 110 will be released and bled-off in a manner dictated by the type of fluid used.

In operation, the pressure assisted hand tool shown in FIG. 20 is prepared with the anchoring head of a tag secured in the support channel and capture clip much the same as previously described in the other embodiments. The ear E or element to be pierced is positioned as shown between the openings 102 and 104 of the arms 92 and 100, respectively. All three arms 92, 100 and 98 are manually pivoted and squeezed together to properly hold the ear and perform the slitting operation which is accomplished by the penetration of the point of the blade 28. Upon reaching its farthest penetration, the point of the blade 28 passes under the anchoring head of the tag and switch 136 is energized which opens the valve 144 to pressurize the cylinder 110. With the three arms still held together manually, the cylinder rod 132 moves outward causing the arm 126 and link 120 to pivot, causing the pin 124 to move away from the pressure cylinder 110 to an over-center positon locking the gripping finger 128 against the upper surface of the anchoring head and the arm 126 contacts the stop 134. The continued outward movement of the piston rod 132 causes the second arm 98 to move in a counterclockwise direction away from intermediate arm 100 withdrawing the blade 28 from the slit in the ear E or element causing the anchoring head of the tag to be pulled back through the slit with the blade. The yoke 104 restricts the movement of the ear E or element allowing the anchoring head and its locking flanges to be drawn through the slit. Once the tip of the blade 28 has been withdrawn so that the anchoring head is completely through the slit, the surface 140 contacts the switch 138, deenergizing the solenoid and closing the pressure valve 144. Pressure is relieved in the cylinder 110 and an internal spring biasing arrangement which can be provided within the cylinder 110 can return the piston and piston rod 132 to its original retracted position releasing the gripping finger 128 which frees the anchoring head of the tag. Thus, the tool is removed from the tag leaving the tag placed in the ear as previously shown in FIGS. 7 and 8.

It is to be understood that this modified embodiment can also be used to attach tags in an encircling relationship around a pipe or other tubular element as previously shown and described in FIGS. 18 and 19. This pressure assisted hand installation tool is believed desirable in order to facilitate the operation of the tool and to greatly increase the speed of the tagging operation.

From the foregoing, the advantages of this invention are readily apparent. A hand tool has been provided which pierces a slit in an animal's ear from one side and grabs the tip of the anchoring head on the other side of the ear and pulls it through the slit. By using this tool, only the blade or the tag is in the slit at the same time and therefore the chances of tearing the flesh adjacent the slit is minimized since the thickness of material passing through the slit is minimized. The tool advantageously has means for folding the locking flanges of the anchoring head over the neck so that the anchoring head can be pulled through the slit which is substantially the same width as the neck of the tag. This is accomplished by cooperation between a capture clip having spaced fingers which cooperate with side flanges of a channel to bend the locking flanges upwardly at right angles and a folding clip having ends which are parallel to each other and spaced above the blade so that one locking flange is folded over the other locking flange. The device also includes a gripping finger normally spaced above and parallel to the cutting blade which can be pivoted into engagement with the tip of the tag to grip it between the gripping finger and the blade after the slit has been formed whereby the tip of the tag can be pulled through the slit and then the gripping arm released to release the tag from the tool.

A method is disclosed wherein a tag having an elongated neck can be attached to a cylindrical or tubular member such as a cable or conduit. The locking head of the tag is inserted in the capture clip and the neck is brought over the conduit or cylinder to be taggged so that the neck encircles it and the body of the tag is between the locking head and the blade of the tool. Upon closing the tool, the blade pierces a slit in the base of the tag whereupon the tip of the locking head is gripped and pulled back through the slit leaving the tag with the neck encircling the conduit or cable.

The invention has been described in detail with particular reference to the preferred embodiments, but it will be understood that variations and modifications can be effected within the spirit and scope of the invention.

I claim:

1. A hand tool for attaching a tag to an element to be tagged, wherein the tag is of the type which is made of resilient elastomeric material and includes a laterally extensive base for receiving indicia, an anchoring head in the general plan form of an arrowhead with a narrow leading end or tip and rearwardly diverging locking flanges joined to the base by a narrow neck, said tool comprising:
   means for releasably holding the anchoring head of the tag on one side of an element to be tagged;
   element piercing means positionable on the opposite side of the element to be tagged;
   means for moving said element piercing means through the element to be tagged;
   means forming part of said element piercing means for grippingly engaging the tip of the anchoring head after said element piercing means has moved through the element to be tagged;
   means moving said element piercing means back to the opposite side of the element to be tagged to pull the anchoring head through the element so that it is tagged; and
   means releasing said tip engaging means after movement of said element piercing means back to said other side of the tagged element.

2. A hand tool as claimed in claim 1, further including:
   means positionable on the opposite side of the element for supporting the element as said element piercing means pulls the anchoring head through the element.

3. A hand tool as claimed in claim 2, wherein said holding means includes:
   a clip having a pair of spaced fingers for releasably holding said anchoring head, said clip being pivotally mounted for movement between a first raised inserting position for receiving the locking head between said fingers at an angle to the plane of the element and a second attaching position wherein the anchoring head is held in said finger perpendicular to the plane of the element.

4. A hand tool as claimed in claim 2, wherein:
   said piercing means includes a pointed blade mounted for movement along a path generally perpendicular to the element; and
   said engaging means includes a pivoted gripping finger movable from a first position spaced from the surface of said blade for receiving the tip of the anchoring head between said surface of said blade and said gripping finger when said blade is moved from the opposite side of the element to the one side of the element and a second position to grip the tip of the anchoring head between said surface of said blade and said gripping finger for pulling the anchoring head through the element upon return movement of the blade back to the opposite side of the element and then release the tip once the anchoring head is on the opposite side of the element.

5. A hand tool as claimed in claim 4, wherein said supporting means includes:
   a stripping plate engagable with the opposite side of the element to hold the element in rigid condition when the anchoring head is pulled through the element, said stripping plate serving to hold said element while the anchoring head is released from the gripping finger after the anchoring head is pulled through the element.

6. A hand tool as claimed in claim 5, wherein said stripping plate includes:
   a yoke extendable around a substantial portion of said blade to support the element adjacent the blade during movement of the blade back and forth through the element.

7. A hand tool for applying a tag to an ear or other bodily member of an animal, wherein the tag is of the type which is made of resilient elastomeric material and includes a laterally extensive base for receiving indicia, an anchoring head in the general plan form of an arrowhead with a narrow leading end or tip and rearwardly diverging locking flanges joined to the base by a narrow neck, said tool comprising:
   a support bracket;
   a first arm having a first end pivotally connected to said support bracket;
   means for releasably holding the anchoring head of the tag connected to a second end of said first arm;
   a second arm having a first end connected to said support bracket;
   a pointed blade having a base connected to a second end of said second arm and having its point extending toward said holding means, the second ends of said first and second arm being movable toward each other when an animal's ear is therebetween so that said blade pierces the ear and extends through the slit formed in the ear so that said point thereof comes into contiguous relationship with the tip of the anchoring head;
   means on said blade for gripping the tip of the anchoring head between it and the surface of said blade when said blade extends through the ear;
   means connected to said second arm to activate said gripping means when said blade extends through the ear;
   means responsive to the gripping of the tip of the anchoring head by said gripping means to move said respective second ends of said first and second arms away from each other so that said anchoring head is pulled through the slit in the ear; and
   means releasing said gripping means from the tip of the anchoring head after the anchoring head is pulled through the slit in the ear.

8. A hand tool as claimed in claim 7, further including:
   a third arm pivoted intermediate its ends to said support bracket and extending between said first and second arms; and
   a yoke connected to a first end of said third arm extenable around a substantial portion of said blade to support the ear adjacent the slit formed in the ear as the blade moves back and forth through the slit.

9. A hand tool as claimed in claim 8, wherein:
   the second end of said third arm forms a first handle for pivoting said yoke toward said tag holding means to grippingly hold the ear therebetween.

10. A hand tool as claimed in claim 9, wherein:

said gripping means includes a gripping finger extending generally parallel to and spaced from the surface of said blade adjacent the tip thereof and mounted for pivotal movement about said base of said blade;

said activating means includes a clamping rod having one end connected to the base end of said gripping finger and extending generally at a right angle to said gripping finger; and said responsive means includes a fourth arm pivoted intermediate its ends about a pivot point on said support bracket, having a first end pivotally connected to the second end of said clamping rod, the second end of said fourth arm forming a second handle for pivoting the second end of said rod past the center line of said pivot point to move said finger toward said blade to grip the tip of an anchoring head and to bring said first end of said fourth arm into engagement with said second arm intermediate its ends whereupon continued movement of said second handle causes said blade and gripping finger to move away from said tag holding means and back through said yoke to pull the anchoring head through the slit in the ear.

11. A hand tool as claimed in claim 9, wherein:

said gripping means includes a gripping finger extending generally parallel to and spaced from the surface of said blade adjacent the tip thereof and mounted for pivotal movement about said base of said blade;

said activating means includes a clamping rod having one end connected to the base end of said gripping finger and extending generally at a right angle to said gripping finger; and said responsive means includes a pneumatic cylinder connected to said clamping rod to move said clamping rod to cause said finger to move toward said blade to grip the tip of the anchoring head and to pivot said second arm so that said blade and gripping finger move away from said tag holding means and through said yoke to pull the anchoring head through the slit in the ear.

12. A hand tool as claimed in claim 10 further including:

a resilient means interconnecting said first end of said fourth arm with said second arm intermediate its pivot and said yoke to normally urge said yoke away from said tag holding means and to urge said gripping finger away from said blade.

13. A hand tool as claimed in claim 10 or claim 11 wherein said second end of said first arm includes:

a generally U-shaped channel attached at substantially right angles thereto and extending away from said second arm; and said means for releasably holding said anchoring head includes:

a capture clip pivoted to the distal end of said channel, having spaced pairs of fingers for releasably holding the anchoring head on opposite sides of the neck and a lever for pivoting said clip between a raised anchoring head receiving position and a lowered position wherein said pairs of fingers cooperate with the sides of said channels to bend the locking flanges at right angles to the remainder of the anchoring head.

14. A hand tool as claimed in claim 13, further including:

a pair of yieldable spring fingers attached adjacent said second end of said first arm and extending over the open end of said channel from opposite sides between said capture clip and said yoke for folding the locking flanges over on top of each other so that they are generally parallel to the remainder of the anchoring head for passage through the slit in the ear.

15. A hand tool as claimed in claim 14, wherein:

the end of one of said spring fingers extends over and generally parallel to the end of the other spring finger for folding and holding the locking flanges over each other for passage through the slit.

* * * * *